(No Model.)
F. W. ROLF.
THILL COUPLING.
No. 531,565. Patented Dec. 25, 1894.
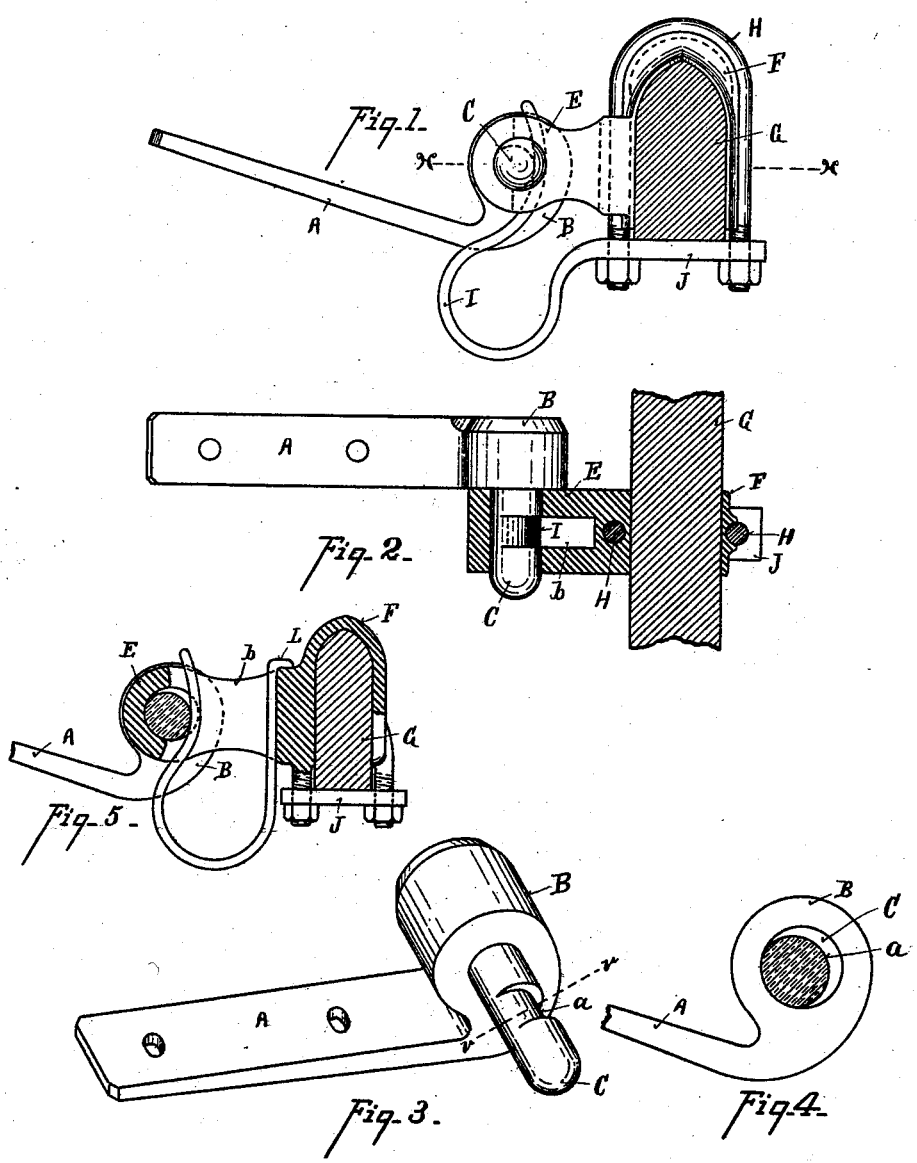
Attest
C. W. Miles
G. W. Rea
Inventor
Frederick Wm Rolf
By Wood & Boyd, attys

UNITED STATES PATENT OFFICE.

FREDERICK WILLIAM ROLF, OF LAWRENCEBURG, INDIANA.

THILL-COUPLING.

SPECIFICATION forming part of Letters Patent No. 531,565, dated December 25, 1894.

Application filed April 6, 1894. Serial No. 506,595. (No model.)

*To all whom it may concern:*

Be it known that I, FREDERICK WILLIAM ROLF, a citizen of the United States, residing at Lawrenceburg, in the county of Dearborn and State of Indiana, have invented certain new and useful Improvements in Thill-Couplings, of which the following is a specification.

My invention relates to a thill-coupling.

One of the objects of my invention is to provide a device which will couple thills to an axle eye or bearing without the use of nuts or screws.

Another object of my invention is to provide a locking spring which will also take up lost motion and prevent rattling as well as locking the thill-journals in position.

The features of my invention will be fully set forth in the description of the accompanying drawings, making a part of this specification, in which—

Figure 1, is a side elevation of one side of my improvement attached to the axle. Fig. 2, is a section on line $x, x$, Fig. 1. Fig. 3, is a perspective view of the thill-iron. Fig. 4, is a section on line $v, v$, Fig. 3. Fig. 5, is a central vertical section of a modification.

A represents the thill-iron; B, the hub or boss on the rear end of the iron. C represents a stud pin. E represents the axle eye. The preferred form of construction is to make it integral with the saddle F which embraces the axle G.

H represents the ordinary yoke or U shaped bolt for clamping the thill-eye to the axle. In this form of construction one limb of the bolt passes through a hole pierced vertically through the thill-eye. The stud pin C journals in the axle eye. It is provided with a groove or recess $a$, opposite the slot $b$, in the thill-eye. I represents a spring which in the form of construction shown in Fig. 1, is an extension of the yoke plate J. The free end of said spring projects up through the mortise $b$ and rests in the groove or recess $a$ of the journal pin C, and the shoulders of the pin at the sides of the groove or recess $a$ bear against the sides of the spring, thereby holding the journal pin and thills laterally in position, while the journal C is free to oscillate in its bearing.

In the preferred form of construction the slot or recess $a$, is crescent shaped leaving the periphery of the stud between the shoulders of the stud eccentric. When the slot is constructed in this manner the pressure of the spring is least. When the thills are held in position for guiding the carriage and as the thills are dropped the eccentricity of the stud increases the strain of the spring and prevents the thills from dropping suddenly; but several objects of this invention are accomplished without this feature of eccentricity.

I have shown only one form of thill-coupling as the opposite thill-coupling is exactly the same one being the counterpart of the other, and are usually employed as rights and lefts.

It is not absolutely essential that the stud pin C should be made integral with the thill-iron, but it is rigidly connected to the thill-iron as it does not have to be removed in coupling and uncoupling the parts.

In the modification shown in Fig. 5, the spring instead of being formed by the extension of the yoke plate is inserted in the mortise $b$ of the thill-eye E, and the spring is provided with a lug or catch L engaging against the off-set in the saddle F so that the spring may be made detachable by compressing the free arms. In some respects this form of construction is preferable over that shown in Fig. 1, as in case the spring is broken it can be replaced.

Mode of operation: The axle eyes E are clamped to an axle. The thill-irons are attached to the thills with a stud pin projected outwardly. The free arm of the spring is projected up through the mortise $b$. The stud pin C of one thill-iron is inserted into its bearing. It forces the spring E back so as to allow it to pass through and the spring will recoil and lie in the recess $a$ of the stud. The opposite iron can be inserted by springing the thill and thill-iron inward far enough to allow the points of the stud pin to pass inside of the thill-eye when it is brought back opposite the bearing in said eye and will force itself into position when the strain is removed from the thill. The thills are removed in the following manner: The free arm of one spring is forced back out of the recess $a$. The thill and the thill-iron are sprung inward until the stud pin C has passed out of the eye, when the opposite stud pin is released in the same manner. Of course the stud pin C could enter from the outside of the axle eye passing inward. It is immaterial which mode is adopted.

I claim—

A thill coupling consisting of the saddle F clamped to the axle and having an eye E provided with the vertical slot $b$, the thill iron A provided with boss B, the stud or pin C having one end rigidly connected with said boss and its other end engaged in the eye E and provided with a groove or recess $a$, registering with the slot $b$ in said eye, and the spring I connected at one end with the saddle of the axle and having its other end extended through the slot $b$ of the eye E and engaged in the groove or recess $a$, of the pin C, substantially as and for the purpose specified.

In testimony whereof I have hereunto set my hand.

FREDERICK WILLIAM ROLF.

Witnesses:
WILLIAM N. ECKSTEIN,
JOHN L. KOCH.